(12) United States Patent
Hoff et al.

(10) Patent No.: US 7,823,929 B2
(45) Date of Patent: Nov. 2, 2010

(54) RADIAL ROTARY TRANSMISSION LEADTHROUGH

(75) Inventors: Dennis Hoff, Mainz (DE); Stephan Ott, Wiesbaden (DE)

(73) Assignee: GAT Gesellschaft fur Antriebstechnik mbH, Wiesbadan (DE)

( * ) Notice: Subject to any disclaimer, the term of this patent is extended or adjusted under 35 U.S.C. 154(b) by 0 days.

(21) Appl. No.: 12/208,406

(22) Filed: Sep. 11, 2008

(65) Prior Publication Data
US 2009/0066080 A1 Mar. 12, 2009

(30) Foreign Application Priority Data
Sep. 11, 2007 (DE) .................. 10 2007 043 026

(51) Int. Cl.
*F16L 27/00* (2006.01)
(52) U.S. Cl. .................... 285/121.3; 285/273
(58) Field of Classification Search ........... 285/273, 285/13, 98, 120.1, 121.1, 121.2, 121.3, 121.4, 285/121.5, 121.6, 275
See application file for complete search history.

(56) References Cited

U.S. PATENT DOCUMENTS

| | | | | |
|---|---|---|---|---|
| 3,411,526 A | * | 11/1968 | Schaefer | 137/312 |
| 4,142,084 A | * | 2/1979 | Torrani | 219/60 A |
| 4,422,676 A | * | 12/1983 | Sitabkhan | 285/121.4 |
| 5,799,692 A | * | 9/1998 | Gobell et al. | 137/580 |
| 6,073,970 A | | 6/2000 | Ott et al. | |
| 6,485,062 B2 | * | 11/2002 | Omiya et al. | 285/121.1 |
| 7,083,200 B2 | * | 8/2006 | Falconer | 285/121.3 |

FOREIGN PATENT DOCUMENTS

| DE | 19621020 A1 | 11/1997 |
|---|---|---|
| GB | 2171765 A | 9/1986 |

* cited by examiner

Primary Examiner—Aaron Dunwoody
(74) Attorney, Agent, or Firm—Paul & Paul

(57) ABSTRACT

The present invention relates to a radial rotary transmission leadthrough with a rotating shaft which has at least two substantially axially running channels (4, 4') which have radial transition openings (5) open to the periphery of the shaft, and with at least one guide bush (2, 2a) tightly surrounding the shaft (1) in the area of the transition openings (5) which has at least one radial feed bore each (6) for every one of the channels (4, 4') to be connected via the bush (2, 2a), wherein the different channels (4, 4') have their radial transition openings (5) at different axial positions of the shaft (1). In order to create a radial rotary transmission leadthrough of the type named at the outset which has a small axial length and by which, despite small friction, the leakage rates can be reduced and accordingly the risk of the shaft jamming in the bush can be minimized, it is proposed according to the invention that the rotary transmission leadthrough has at least two bushes (2, 2a) which encompass the shaft (1) for the connection with different channels (4, 4') at axially different positions, and which are housed independently of each other in a common bush holder (10), wherein at least one of the bushes has several radial feed bores (6, 6a, 6').

11 Claims, 2 Drawing Sheets

RADIAL ROTARY TRANSMISSION LEADTHROUGH

BACKGROUND OF THE INVENTION

Figure 1:
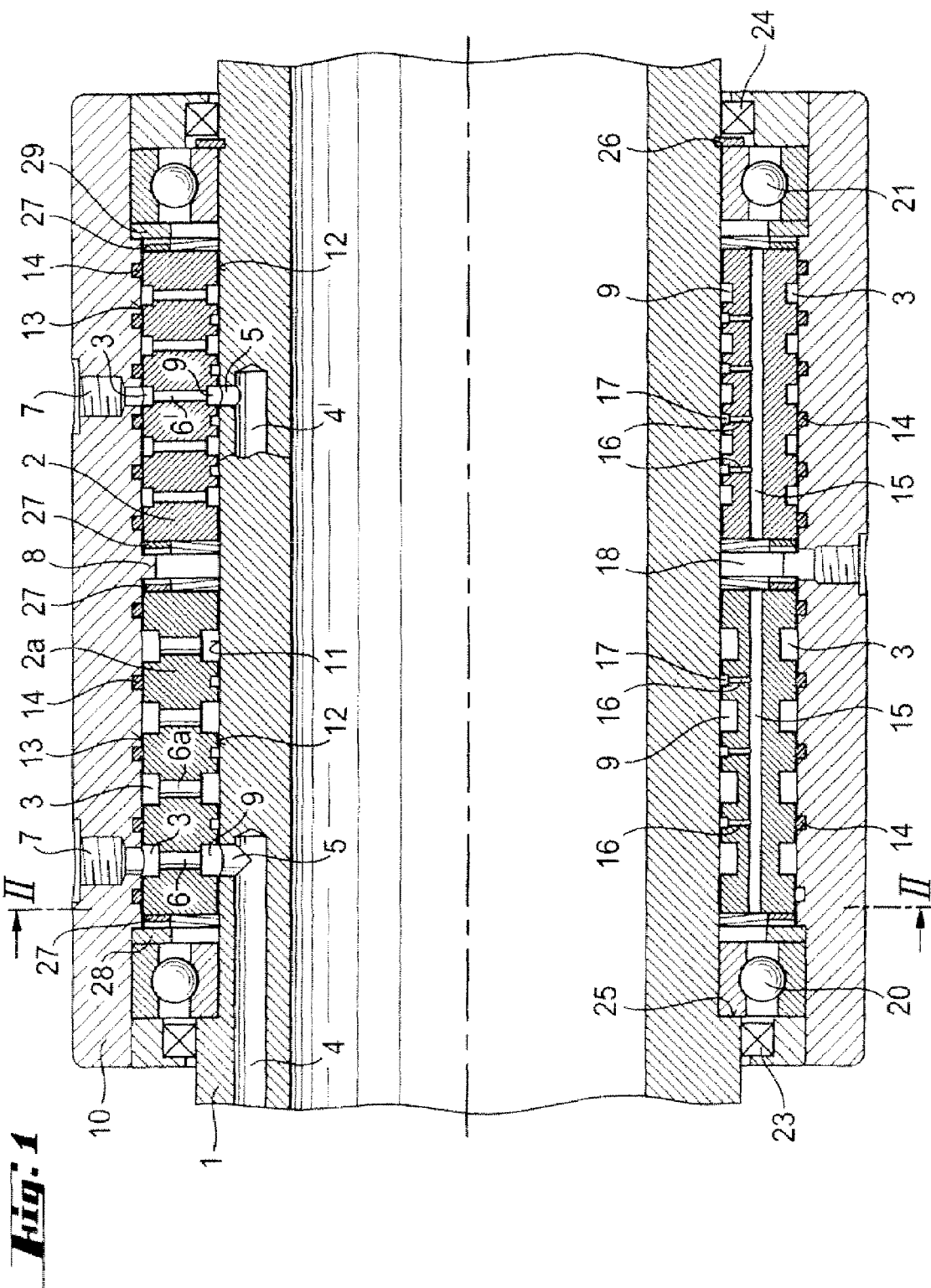

The present invention relates to a radial rotary transmission leadthrough with a rotating shaft which has at least two substantially axially running channels which have radial transition openings open to the periphery of the shaft, and with at least one guide bush tightly surrounding the shaft in the area of the transition openings which has at least one radial feed bore each for every one of the channels to be connected via the bush, wherein the different channels have their radial transition openings at different axial positions of the shafts.

Radial rotary transmission leadthroughs of this type have already been long known.

The corresponding radial feed bores in the bush lie on the same axial position as a radial transition opening of that channel in the shaft with which the feed bore concerned is to be connected. In this way a gas or a liquid can be introduced via the feed bore and the radial transition opening into the concerned channel of the shaft or conversely a corresponding fluid can pass out of the channel of the shaft via the transition opening into the feed bore and from there into the associated external fluid system.

Corresponding channels and feed bores are very frequently needed to operate, at one end of the shaft, hydraulically actuatable elements connected to the former, by supplying or removing corresponding hydraulic fluid under pressure. Expediently, there is provided in each case, at axial height of a pair of feed openings each consisting of the corresponding feed bore and the radial transition opening of the channel in the shaft, an encircling groove in the area of the sealing faces between shaft and bush, with the result that, regardless of the relative rotation position of the transition opening in respect of the feed bore fluid can be continuously fed into the channel or removed from the channel. To separate the different channels, it is accordingly imperative that the different feed bores and also the different transition openings of the different channels are spaced apart from one another in axial direction.

The channels extend substantially in axial direction through the shaft, wherein these can optionally be annular channels lying around a central channel and/or concentrically around the centre, but optionally also corresponding axial bores can be provided in the shaft which, depending on the length of the shaft, are either created directly by bores or e.g. by having the shaft composed of a core and a sleeve or a central tube and an outer tube, wherein corresponding grooves are cut into the outer wall of the inner core or tube and/or into the inner wall of the outer tube (which have the same diameter), which form a corresponding axial channel after the two parts have been put together.

From time to time, several such rotary transmission leadthroughs are placed axially one behind the other at a shaft which has the matching radial feed bores and transition openings at the respective positions of these rotary transmission leadthroughs. Alternatively, several transition bores can be provided at different axial positions in a bush. However, a group of rotary transmission leadthroughs arranged axially behind one another requires a relatively long section of the shaft. On the other hand, a rotary transmission leadthrough with one bush with a plurality of radial feed bores, though shorter, still has a considerable axial length, as each of the channels requires a certain axial space because the transition openings and the corresponding feed bores of different channels must each lie at a different axial position and because the grooves of respective neighbouring channels/feed bores are generally also to be separated from one another by an axially sufficiently long section of a sealing face. It is understood that, for this, the inner surface of the bush must be in relatively tight sliding engagement with the outer surface of the shaft, wherein within the framework of the present description these sections of bush and shaft are called sealing faces. These sealing faces are cylindrical inner and outer surfaces respectively with virtually the same diameter, with the result that they can slide directly on one another if one of the two parts rotates relative to the other, wherein in general the shaft is formed as the rotating machine part. However, in principle the shaft could also be connected to a stationary machine part, while the bush would be connected to a rotating machine part, wherein in this case, however, the axial channels should be arranged in the bush and the radial feed bores would have to be arranged in the shaft, which would then expediently be a hollow shaft.

It is understood that when there is a large number of channels and a correspondingly large number of transition openings and feed bores the axial length of the bush must also be correspondingly large, and that it is generally difficult to provide two components with constantly equal diameters over a relatively great axial length, with the result that the thus-produced sealing faces form only a very narrow sealing gap and e.g. slide over a film, conveyed from the channels or feed bores, made of a fluid, without the friction between bush and shaft becoming too great and bringing about a possibly excessive heating of the sealing ring faces and also the surroundings including the fluids to be passed though. However, the sealing gap is to be kept as small as possible, in order that the otherwise unavoidable leakage rates are as small as possible and also fluids from different channels do not mix with one another, nor must there be a reciprocal pressurization of neighbouring channels.

In general, a corresponding bush for equalizing any tolerances of the sealing faces is housed "floating". i.e. it is housed such that it receives an (albeit small) radial and axial movement margin. However, tolerance deviations of the sealing faces which require a corresponding radial movement space inevitably also mean that the play or the seal gap between the sealing faces is relatively large in places, with the result that the leakage rates are also accordingly greater. Too great an axial movement margin can cause the bush to tilt or tip, with the result that diagonally opposite inner edges of the bush come into too strong a frictional engagement with the shaft, whereby the shaft can jam in the bush in unfavourable circumstances.

SUMMARY OF THE INVENTION

Compared with this state of the art, the object of the present invention is to create a radial rotary transmission leadthrough of the type named at the outset which has a small axial length and by which, despite small friction, the leakage rates can be reduced and accordingly the risk of the shaft jamming in the bush can be minimized.

This object is achieved by the rotary transmission leadthrough having at least two bushes which encompass the shaft for the connection to different channels at axially different positions, and which are housed independently of each other in a common bush holder, wherein at least one of the bushes has several radial feed bores.

FURTHER DESCRIPTION OF THE INVENTION

It is understood that the several bushes now provided instead of a single bush as before can each be axially clearly shorter in itself without being noticeably longer in total than a single bush with a corresponding plurality of feed bores, wherein the condition of the sealing faces to be produced with narrow tolerances on the correspondingly shorter axial length can be more easily met. Moreover, for one and the same tilting angle, the excursions of the edges of a shorter bush are correspondingly smaller than in the case of a longer bush. However, this assumes that each of the bushes is housed independently of the other(s) in one [of the] common bush holder[s], wherein each of the bushes can have its own, separate (axial) bearing arrangement or support, wherein these bearing arrangements or supports of different bushes can however also be connected to each other and in every case are part of the same common holder.

At the same time, however, the housing according to the invention of the bushes in a common bush holder means that overall this rotary transmission leadthrough is axially much shorter than a series of individual rot transmission leadthroughs each with its own holder arranged axially one behind the other on the shaft.

According to an embodiment of the invention it is proposed that the holder is a housing jointly encompassing the bushes which has independent bearing elements for each of the bushes. It is understood that the number of bushes can be chosen as desired, wherein it should be sufficient for practical purposes if the hitherto known, relatively long bushes for a large number of channels (up to ten or even more channels) are replaced by only two or at most three bushes, each of which has several and in total the same number of feed bores as the corresponding longer bush, in order to exploit the advantages of the following invention. Theoretically it would of course also be possible to give every single channel its own bush, but they would all have to be accommodated in the common holder.

According to an embodiment of the present invention at least some of the bushes are housed resilient in axial direction in their holder, wherein, to guarantee a small overall length, it is expedient, but also sufficient for the independent bearing arrangement, if in practice the corresponding, optionally necessary spring travels are very short, with the result that according to an embodiment such springs consist of for example slightly corrugated spring washers or conically shaped sheet spring washers or the like. The use of other and axially longer springs is of course not excluded. The bearing elements for the individual bushes can be kept axially very short and consist of for example a collar or a circlip fitted into or onto the shaft in the holder, which, on the side facing one bush, optionally on both sides, can have a shaft spring washer or a cone spring washer, in order to support or house the respective bush independently and with small axial play.

As is already known in principle from the state of the art, it is provided according to an embodiment of the present invention that the radial transition openings and the feed bores open out into grooves provided in each case at the transition of the sealing faces of shaft and bush, wherein in each case a groove is allocated to a pair of openings each consisting of a feed bore and a transition opening. The supply and removal of fluid respectively into the channels and out of the channels independently of the relative rotation position of the shaft to the bush concerned is thus guaranteed. Theoretically, the groove could be provided both in the outer surface of the shaft and in the inner surface of the bush concerned, but according to an embodiment of the present invention the groove concerned is provided either only in the inner surface of the bush or only in the outer surface of the shaft. It is understood that the creation of bush and shaft is made less costly if the encircling grooves are to be formed in only one of the two parts.

It is further provided according to an embodiment of the present invention that there are provided, between at least some of the axially neighbouring feed bores, radial relief bores which are in flow connection with a leakage channel which is provided in common for at least some of the relief bores. The leakage channel concerned then expediently runs in axial direction in a bush or also outside the bush, for example in the housing tightly connected to the bushes.

Such relief bores should also expediently be connected to each other by encircling grooves at the transition of the sealing faces between shaft and bush. These relief bores thus also open out into a groove, wherein also in the case of the groove provided for the relief bore the former is provided according to an embodiment either only in the inner surface of the bush or only in the outer surface of the shaft. Expediently, the grooves should be formed for the transfer of fluids just like the grooves of the relief bores in each case in the same component. At least some of the relief bores are connected to the same axial relief channel inside the bush or inside the housing, wherein, depending on the property of the fluids which must be removed through the relief bores, all the relief bores must also be connectable to one and the same relief channel. This applies in particular in the case of identical fluids such as e.g. in the case that the channels are all provided for hydraulic actuating elements which are all operated with the same hydraulic fluid (or in the case of a pneumatic system with air or gas). However, even then the relief bores still serve a purpose, because they also uncouple the neighbouring feed bores in pressure engineering terms, i.e. a relatively high pressure in one of the fluid channels which is permanently maintained cannot be transferred by the unavoidable leak remaining between the sealing faces to the channel connected to the neighbouring feed duct, as the relief channel already ensures a pressure relief beforehand.

It is also expedient if in each case a leakage chamber for the collection and removal of leaking liquids or leaking fluids is also provided between neighbouring bushes. This is simply achieved by a corresponding distance between the bearing elements of neighbouring bushes, which can remain relatively small, with the result that in any case an encircling annular space which can serve as leakage chamber remains between the bushes.

The somewhat increased space requirement due to the distances needed for relief bores and additional bearing elements between bushes, compared with a single bush with the same number of channels, comes to not more than 5% to 10% at most in practice, with the result that the advantages of the improved fit of the sleeves outweigh this in any case.

According to an embodiment of the invention, the bushes are clamped elastically pre-loaded in axial direction between outer ball bearing rings of two ball bearings rotatably housing the shaft. This leads, in every position, to the establishment of a certain equilibrium position in which the shaft remains centred even if for example the rotary transmission leadthrough is aligned with its central axis not horizontal, but vertical, wherein here the spring elements are also still additionally loaded by the weight of the bushes below the bushes, for example in the form of corrugated rings; but the springs should be chosen such that, in this position also, the upper springs (not loaded by the weight of the bushes) are likewise still tensed, albeit accordingly less, as they are no longer loaded by the weight of the bush, but only because the axial length of the bush is greater than the clear distance between the springs in the unloaded state and also the spring travel is kept correspondingly short by the weight of the bush.

According to an embodiment of the invention, the shaft or the section of the shaft containing the sealing faces is axially clamped between the inner rings of the ball bearings, wherein, at the axial ends of the housing accommodating the bushes, two floating ring seals are also additionally attached to the housing and enter into sealing engagement with the surfaces of the shaft axially outside the bushes (and axially outside the ball bearings). These seals can also be connected to a leakage chamber, with the result that any fluid which collects at these seals on the inner side facing the bushes can be removed.

Further advantages, features and application possibilities of the present invention become clear with the help of the following description of a preferred embodiment and the associated drawings. These are shown in the figure descriptions.

BRIEF DESCRIPTIONS OF THE DRAWING FIGURES

Figure 2:
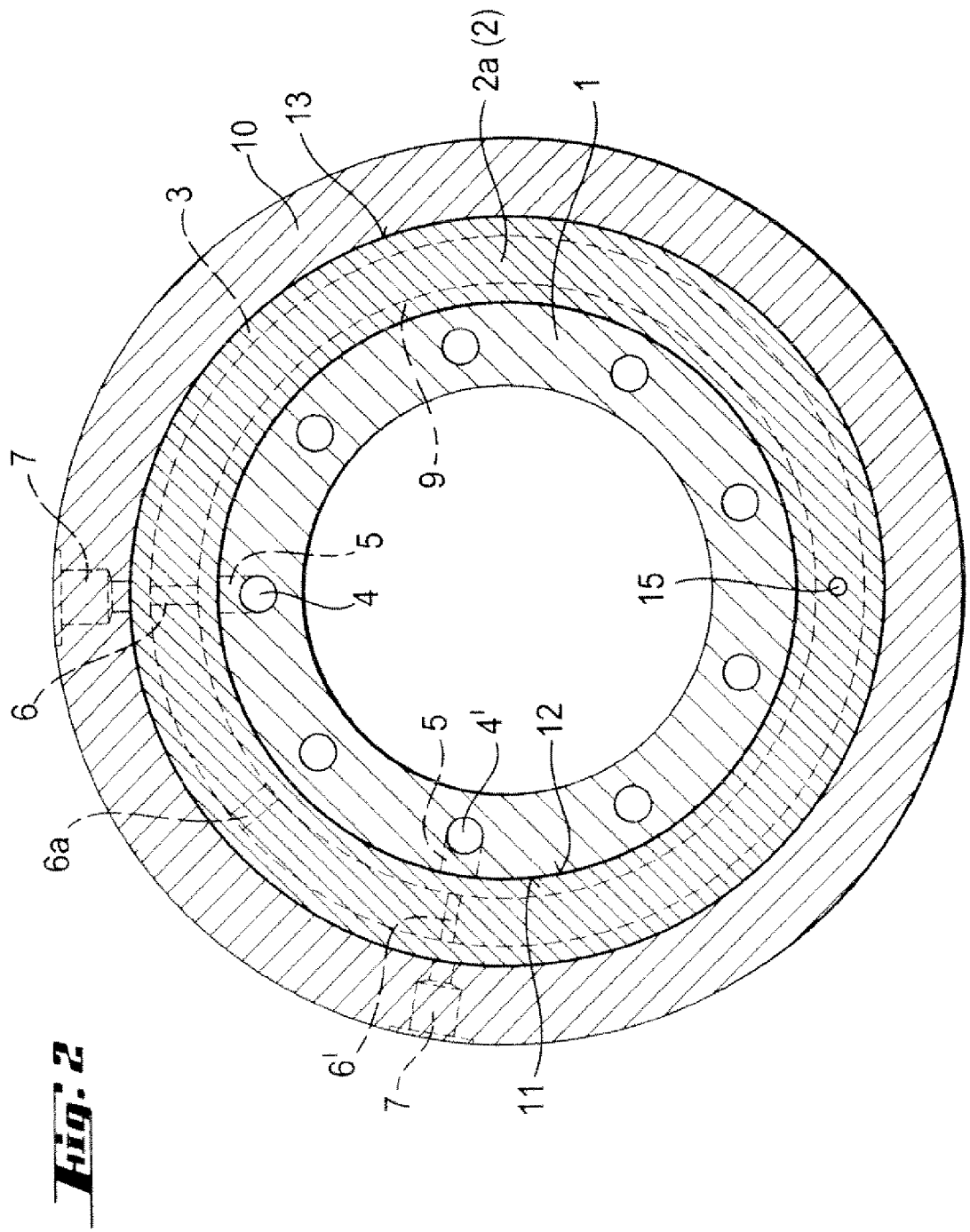

FIG. 1 an axial longitudinal section through a radial rotary transmission leadthrough according to the present invention which has two bushes, FIG. 2 a view of a section along the line II-II in FIG. 1.

DETAILED DESCRIPTIONS OF THE PREFERRED EMBODIMENTS

There can be seen in FIG. 1a rotatable shaft 1, which in the present case is formed as a hollow shaft and which according to an embodiment of the invention can have a relatively large outer diameter of more than 100 mm and e.g. of 300 mm, wherein this measurement relates here to the diameter of the sealing face 11.

The shaft 1 is housed over two ball bearings 20, 21 against or in a housing 10, wherein the shaft has, for the engagement with the inner ball bearing rings of ball bearings 20, 21, a shoulder 25 at one end and a locking ring 26 at the other end. The axial position of the shaft 1 relative to the housing 10 is thus fixed. The axial position of the ball bearings 20, 21 in the housing 10, more precisely of the corresponding outer bearing rings, is of course also fixed by corresponding shoulders or locking rings at the housing 10. Between the ball bearings 20, 21 can be seen axially one behind the other two bushes 2, 2a which are housed via spring elements 27 and bearing elements 28 and 29 (some of which are again locking rings or the like) preloaded in axial direction in the housing 10 or between the outer rings of the ball bearings 20, 21 supported in the housing and the collar 8 between the bushes 2, 2a. Spring elements 27 are also provided on the faces of the locking rings 28, 29 facing the bushes. The bushes 2, 2a have a small axial play in axial direction, determined by the design of the spring elements 27.

The bushes each have feed bores 6, 6a, 6', all of which have been shifted into the plane of the drawing in FIG. 1 and can be seen through the bush in the upper part of the sectional picture. All of the relief bores 16 have also been shifted into the plane of the drawing and are accordingly shown in the bushes 2, 2a in the lower half, i.e. that lying diametrically opposite the feed bores 6.

It is understood that, although the feed bores 6, 6a, 6' and the relief bores 16 could actually also lie in a common plane spanned by the same angle direction and the axis, it is frequently expedient for practical reasons to shift these bores in circumferential direction to different angle positions.

The bushes 2, 2a have in each case in the area of every feed bore 6, 6a, 6' at their inner sealing face 12 an encircling groove 9 which, regardless of the relative angle position between the radial transition opening 5 and the feed bore 6, guarantees the connection between the feed bore 6 and the associated channel 4. For example, some channels 4' of the shaft 1 are connected to the grooves 9 of the bush 2 which belongs to the feed bores that can be seen in the upper half of the picture, of which one is numbered 6' while other channels 4 are connected to the grooves 9 of the bush 2a which belong to the feed bores numbered 6 or 6a of the bush 2a. Every one of the feed bores 6, 6a, 6' is therefore connected in each case to another channel running axially in the shaft 1, wherein apart from the channels 4 and 4' in FIG. 1 the remaining channels cannot be seen, because they lie in different peripheral positions from the channels 4, 4' shown in the section. The grooves 9 can alternatively or additionally also be provided in the cylindrical outer surface or sealing face 11 of the shaft 1.

FIG. 2 shows an end-face view of the rotary transmission leadthrough, corresponding to a view of the rotary transmission leadthrough of FIG. 1 from the left. The hollow shaft 1 can be seen in the centre. Several bores axially provided in the shaft 1 can also be seen, of which here only two of the bores are numbered 4, 4', which according to FIG. 1 have the connection with the feed bores numbered 6 and 6' respectively there.

There can also be seen in FIG. 2 the position of the sealing faces 11, 12 of the shaft 1 or of the bushes 2, 2a which are reproduced by a common circle line.

It can also be seen in FIG. 1 that, in the bushes 2, 2a, between axially neighbouring feed bores 6, 6a and 6', radial relief bores 16 are provided which are in flow connection with an axially extending leakage channel 15 which is a common leakage channel for at least some of the relief bores 16. This leakage channel 15 opens out into a leakage chamber 18 which is provided between the two bushes 2, 2a to collect and remove leaking liquids. At least some of the relief bores are connected to the same axial relief channel 15 inside the bush 2, 2a.

The relief bores 16 are also connected to encircling grooves 17 at the transition of the sealing faces 11, 12 between shaft 1 and bush 2, 2a, which catch, along the whole of the periphery of the shaft, any fluid which penetrates between the sealing faces 11, 12 from a directly neighbouring groove 9.

Floating ring seals 23, 24 are attached to the housing (10) at the axial ends of the housing 10 accommodating the bushes and engage axially outside the bushes (2, 2a) with the surface of the shaft 1.

The bushes 2, 2a are accommodated, sealed off by elastomeric seals 14, in the housing 10, whereby the bushes are fixed substantially rotation-resistant in the housing 10. The seals 14 separate the individual grooves 3 on the outer surface 13 of the bushes 2, 2a, in order to prevent, there also, an overflow of leakage fluid between the individual channels. The housing 10 has radial feed bores 7 for the connection to the corresponding feed bores 6, 6a, 6' of the bushes 2, 2a, which likewise can be provided at different angle positions, with the result that in FIG. 1 only one such feed bore 7 is visible. The grooves 3 in the outer surface 13 of the bushes 2, 2a and/or the inner surface of the housing 10 again ensure a connection between the feed bores 7 of the housing and the radial feed bores 6, 6a, 6' of the bushes 2, 2a, even if the peripheral angle positions of the bores 7, 6 etc. do not agree.

For purposes of the original disclosure it is pointed out that all features such as arise for a person skilled in the art from the present description, the drawings and the claims, even if they have specifically been described only in connection with specific further features, can be combined both individually and also in any compositions with others of the features or groups of features disclosed here, unless this has been expressly ruled out or technical circumstances make such combinations impossible or pointless. The comprehensive, explicit description of all conceivable combinations of features has been dispensed with here only for the sake of brevity and readability of the description.

LIST OF REFERENCE NUMBERS

1 Shaft
2 Bush
2a Bush
3 Groove
4 Channel
4' Channel
5 Radial transition opening
6 Feed bore
6a Feed bore
6' Feed bore
7 Feed bore
8 Collar
9 Groove
10 Housing
11 Sealing face
12 Sealing face
13 Outer surface
14 Elastomeric seals
15 Leakage channel
16 Relief bore
17 Groove
18 Leakage chamber
20 Ball bearing
21 Ball bearing
23 Floating ring seal
24 Floating ring seal
25 Shoulder
26 Locking ring
27 Spring element
28 Bearing element
29 Bearing element

What is claimed is:

1. Radial rotary transmission leadthrough with a rotating shaft having a surface, which shaft has at least two substantially axially running channels (4, 4') which have radial transition openings (5) open to the surface of the shaft, and with at least one guide bush (2, 2a) tightly surrounding the shaft (1) proximate the radial transition openings (5) which has at least one radial feed bore each (6) for every one of the channels (4, 4') to be connected via the bush (2, 2a), wherein the channels (4, 4') have their radial transition openings (5) at axial positions of the shaft (1), characterized in that there are at least two bushes (2, 2a) encompassing the shaft (1) one each, respectively, for a connection with a respective one of the channels (4, 4') at axially different positions, and which are housed independently from each other in a common bush holder (10), wherein at least one of the bushes (2, 2a) has several radial feed bores (6, 6a, 6');

characterized in that the bushes (2, 2a) are accommodated, sealed off by elastomeric seals (14), in the housing (10), wherein the housing (10) has radial feed bores (7) for the connection to the corresponding feed bores (6, 6a, 6') of the bushes (2, 2a); and also including a plurality of grooves (3) on the outer surface (13) of the bushes (2, 2a), characterized in that the elastomeric seals (14) separate the individual grooves (3).

2. Radial rotary transmission leadthrough according to claim 1, characterized in that there are a plurality of the guide bushes (2, 2a), and that the holder is a housing (10) jointly encompassing the bushes (2, 2a) which has independent bearing elements (28, 29) for each of the bushes (2, 2a).

3. Radial rotary transmission leadthrough according to one of claims 1 and 2, characterized in that at least some of the bushes (2, 2a) are housed resilient in axial direction in the holder.

4. Radial rotary transmission leadthrough according to one of claims 1 and 2, wherein the shaft (1) has sealing faces (11, 12), the leadthrough also having a plurality of encircling grooves (9) provided in the sealing faces (11, 12) of the shaft (1) and bush (2, 2a), characterized in that each respective radial transition opening (5) and each respective feed bore (6, 6a, 6') opens out into a respective one of the plurality of encircling grooves (9) provided in the sealing faces (11, 12) of the shaft (1) and bush (2, 2a).

5. Radial rotary transmission leadthrough according to claim 4, characterized in that a groove (9) belonging to a respective pair of a radial transition opening (5) and a feed bore (6, 6a, 6') is provided either in the inner surface of the bush (2, 2a) or in the outer surface of the shaft (1).

6. Radial rotary transmission leadthrough according to one of claims 1 and 2, characterized in that there are provided, a plurality of relief bores (16) in each bush (2, 2a) between axially neighbouring feed bores (6, 6a), said radial relief bores (16) being in flow connection with axial leakage channel (15) which is a common leakage channel for at least some of the relief bores (16).

7. Radial rotary transmission leadthrough according to claim 6, characterized in that the relief bores (16) are connected to encircling grooves (17) at the transition of the seal surfaces (11, 12) between shaft (1) and bush (2, 2a).

8. Radial rotary transmission leadthrough according to claim 6, characterized in that at least some of the relief bores (16) are connected to the same axial relief leakage channel (15) inside the bush (2, 2a).

9. Radial rotary transmission leadthrough according to one of claims 1 and 2, characterized in that a leakage chamber (18) for collecting and removing leaking liquids is provided between the at least two bushes (2, 2a).

10. Radial rotary transmission leadthrough according to one of claims 1 and 2, characterized in that the bushes (2, 2a) are clamped resiliently pre-loaded in axial direction between outer ball bearing rings of two ball bearings (20, 21) rotatably housing the shaft (1).

11. Radial rotary transmission leadthrough according to claim 10, characterized in that the shaft (1) or a section of the shaft (1) is axially clamped between the inner rings of the ball bearings (20, 21), wherein, at the axial ends of the housing (10) accommodating the bushes (2, 2a), floating ring seals (23, 24) are attached to the housing (10) and enter into sealing engagement with the surface of the shaft (1) axially outside the bushes (2, 2a).

* * * * *

UNITED STATES PATENT AND TRADEMARK OFFICE
CERTIFICATE OF CORRECTION

PATENT NO. : 7,823,929 B2  Page 1 of 1
APPLICATION NO. : 12/208406
DATED : November 2, 2010
INVENTOR(S) : Dennis Hoff and Stephan Ott It is certified that error appears in the above-identified patent and that said Letters Patent is hereby corrected as shown below:

Column 3, line 18: delete "rot" and insert --rotary--.

Column 5, line 44: delete "elements 28 and 29" and insert --elements 8, 28 and 29--.

Signed and Sealed this

Twenty-first Day of December, 2010

David J. Kappos
*Director of the United States Patent and Trademark Office*